United States Patent
Hong et al.

(10) Patent No.: US 8,760,493 B2
(45) Date of Patent: Jun. 24, 2014

(54) VIDEO DISPLAYING APPARATUS AND CONTROLLING METHOD THEREOF

(75) Inventors: Jin Woo Hong, Daejeon (KR); Kwi Hoon Kim, Daejeon (KR); Chung Hyun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 257 days.

(21) Appl. No.: 13/309,694

(22) Filed: Dec. 2, 2011

(65) Prior Publication Data
US 2012/0140017 A1   Jun. 7, 2012

(30) Foreign Application Priority Data

Dec. 6, 2010 (KR) .................. 10-2010-0123756
Mar. 14, 2011 (KR) .................. 10-2011-0022414

(51) Int. Cl.
*H04N 7/15* (2006.01)
(52) U.S. Cl.
CPC ...................................... *H04N 7/15* (2013.01)
USPC .................... 348/14.1; 348/14.16; 348/14.08; 348/14.09
(58) Field of Classification Search
CPC ......... H04N 7/144; H04N 7/14; H04N 7/141; H04N 7/142; H04N 7/15; H04N 7/152; H04L 65/403
USPC .................... 348/14.01–14.16, 139
See application file for complete search history.

(56) References Cited

U.S. PATENT DOCUMENTS

| | | | |
|---|---|---|---|
| 6,554,433 B1 * | 4/2003 | Holler | 353/79 |
| 8,072,481 B1 * | 12/2011 | McNelley et al. | 348/14.16 |
| 8,421,844 B2 * | 4/2013 | Matthews | 348/14.16 |
| 2008/0043100 A1 * | 2/2008 | Sobel et al. | 348/139 |
| 2010/0185990 A1 | 7/2010 | Ha et al. | |

FOREIGN PATENT DOCUMENTS

| | | |
|---|---|---|
| KR | 1020040010943 A | 2/2004 |
| KR | 1020040051651 A | 6/2004 |
| KR | 1020080041051 A | 5/2008 |

* cited by examiner

*Primary Examiner* — Melur Ramakrishnaiah
(74) *Attorney, Agent, or Firm* — Ladas & Parry LLP

(57) ABSTRACT

Disclosed is a video displaying apparatus including: a projector screen; at least one camera disposed at a predetermined position of the projector screen to acquire a user's video; a communication unit receiving the other party's video from the other video terminal and transmitting the user's video acquired through at least one camera to the other video terminal; and a projector outputting the other party's video so that the other party's video received from the communication unit is displayed on the projector screen.

14 Claims, 7 Drawing Sheets

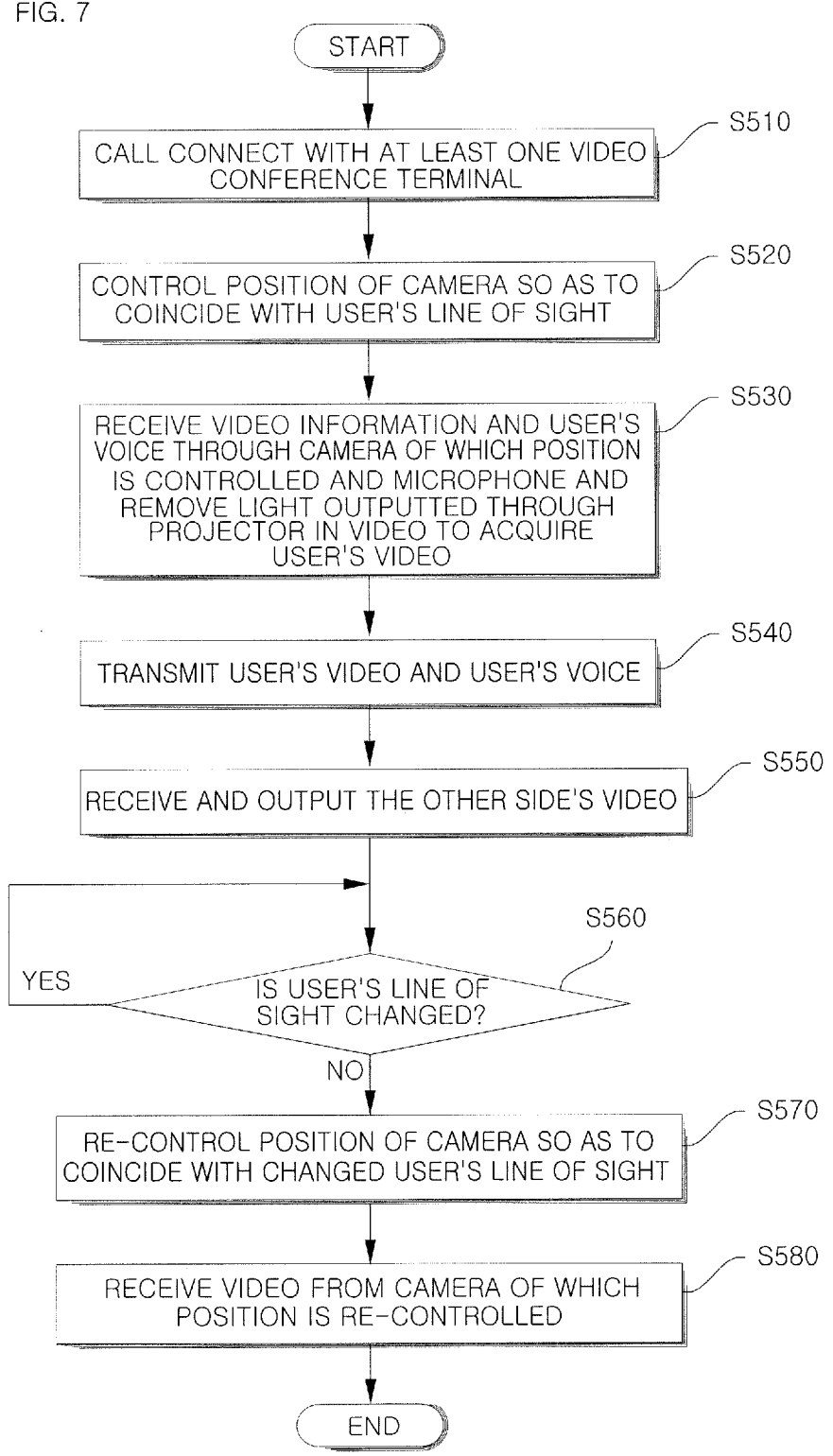

though the present invention has been described in connection with the exemplary embodiments of the present invention, it will be apparent to those skilled in the art that various modifications and changes may be made thereto without departing from the scope and spirit of the invention.

VIDEO DISPLAYING APPARATUS AND CONTROLLING METHOD THEREOF

CROSS-REFERENCE TO RELATED APPLICATIONS

This application claims priority to and the benefit of Korean Patent Application No. 10-2011-0022414 and 10-2010-0123756 filed in the Korean Intellectual Property Office on Mar. 14, 2011, and Dec. 6, 2010, the entire contents of which are incorporated herein by reference.

TECHNICAL FIELD

The present invention relates to a video displaying apparatus matching a line of sight between a user and a camera and freely controlling a size of a video conference screen and a controlling method thereof.

BACKGROUND ART

A video conference system is a bidirectional communication system which receives videos and voices acquired from a plurality of terminals and outputs the videos and voices to different terminals to exchange information while each user (caller) using the plurality of terminals looks at the other party's face.

In each terminal included in the video conference system, since a camera for capturing a user's appearance which is installed at the upper portion of the monitor photographs a user's face video looking at the monitor where the other party's video is provided to provide the photographed user's face video to the other party, the user's appearance displayed on the other's monitor always looks downward, such that a line of sight does not coincide with each other.

Further, a mirror and a half mirror are obliquely installed at a regular angle so as to have a predetermined angle and the camera is installed at the rear of the half mirror so as to watch the video reflected through the mirror with the user's naked eye, such that the position of the user's line of sight and a focus axis of the camera may be configured to be disposed on the same line as each other. However, in the configuration, since a mirror having a screen size so as to reflect the screen output of the monitor displaying the video transmitted from the other party's terminal, a half mirror for re-reflecting the video reflected by the mirror, and the like are additionally required on the front of the monitor, there are inconveniences in that a spatial limit is generated and the position of the user's line of sight and the focus axis of the camera need to coincide with each other by installing a separate auxiliary device for fixing the mirror and the half mirror below the monitor.

In addition, in each terminal included in the video conference system, it is difficult to configure a large screen by using the monitor-based display, the monitor has to be disposed in advance at a fixed place due to a volume thereof, a lot of costs of the monitor are required in proportion to the screen size, and in the case where the video conference system is configured by using a 3D video, an increase in the cost occurs according to the additional installation of the 3D monitor.

SUMMARY OF THE INVENTION

The present invention has been made in an effort to provide a video displaying apparatus matching a line of sight between a user and a camera by inserting one or more cameras in the center or several portions of a display unit and a controlling method thereof.

Further, the present invention has been made in an effort to provide a video displaying apparatus variably providing sizes of one or more videos displayed on the display unit (for example, a screen) based on a projector and providing a 3D video conference and a controlling method thereof.

In addition, the present invention has been made in an effort to provide a video displaying apparatus providing a synchronization function between a projector and a camera in order to prevent a video (or light) outputted from the projector from being reflected on the camera or removing the video (light) outputted from the projector included in the video photographed by the camera by a signal processing method and a controlling method thereof.

An exemplary embodiment of the present invention provides a video displaying apparatus performing a video communication with another video terminal, including: a projector screen; at least one camera disposed at a predetermined position of the projector screen to acquire a user's video; a communication unit receiving the other party's video from the other video terminal and transmitting the user's video acquired through the at least one camera to the other video terminal; and a projector outputting the other party's video so that the other party's video received from the communication unit is displayed on the projector screen.

The video displaying apparatus may further include a synchronization module removing the other party's video outputted from the projector in the video acquired from the camera to acquire the user's video.

The video displaying apparatus may further include a line of sight tracking and controlling module controlling the position of the camera so that the user's changed line of sight and a focus axis of the camera are the same line as each other when the user's line of sight of the video displaying apparatus is changed.

The predetermined position of the projector screen on which the camera is installed may be the center of the projector screen or the screen center on which the other party's video is displayed.

The video displaying apparatus may further include a speaker outputting a voice corresponding to the other party's video displayed on the projector screen.

When the camera is two or more and the user's line of sight is changed, the communication unit may transmit the user's video from the camera when the user's changed line of sight and the focus axis are disposed on the same line as each other to the other video terminal.

Another exemplary embodiment of the present invention provides a controlling method of a video displaying apparatus using a projector in order to communicate with two or more the other parties, the method including: displaying two or more the other party's videos on a projector screen; detecting the other party's video corresponding to the user's line of sight among the two or more the other party's videos; acquiring the user's video acquired from the camera corresponding to the detected other side's video among two or more cameras installed on the projector screen; and transmitting the acquired user's video to the other party's video displaying apparatus.

The controlling method may further include removing the other party's video outputted from the projector in the video acquired from the camera to acquire the user's video.

The present invention provides the following effects.

First, according to exemplary embodiments of the present invention, it is possible to perform a natural call while looking at the other party in a video conference or a video calling by inserting one or more cameras at the center or several portions of a display unit to match a line of sight between a user and a camera.

Second, according to exemplary embodiments of the present invention, it is possible to variably control a screen during a video conference or a video calling and perform a 3D video conference by variably providing sizes of one or more videos displayed on the screen based on a projector and providing the 3D video conference.

Third, according to exemplary embodiments of the present invention, it is possible to dispose one or more cameras at any position on a screen and photograph video information including a user through the corresponding camera by providing a synchronization function between a projector and a camera in order to prevent a video (or light) outputted from the projector from being reflected on the camera or removing the video (light) outputted from the projector included in the video photographed by the camera by a signal processing method.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 is a flowchart illustrating a video conference method according to a fifth exemplary embodiment of the present invention.

Figure 1:
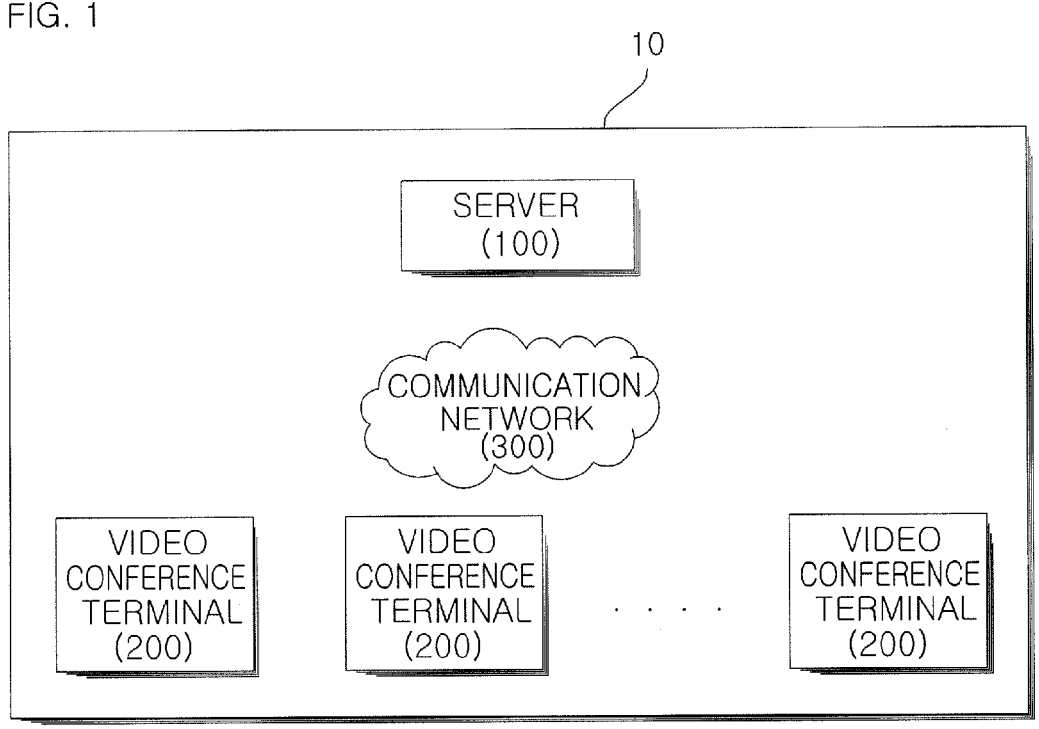
FIG. 1 is a block diagram illustrating a configuration of a video conference system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Exemplary embodiments of the present invention may be implemented by various means. For example, the exemplary embodiments of the present invention may be implemented firmware, software, or a combination thereof, or the like.

In the implementation by the hardware, a method according to exemplary embodiments of the present invention may be implemented by application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the implementation using the firmware or the software, a method according to exemplary embodiments of the present invention may be implemented by modules, procedures, functions, or the like, that perform functions or operations described above. Software codes are stored in a memory unit and may be driven by a processor. The memory unit is disposed in or out the processor and may transmit and receive data to and from the well-known various units.

Throughout the specification, when a predetermined portion is described to be "connected to" another portion, it includes a case where the predetermined portion is electrically connected to the other portion by disposing still another predetermined portion therebetween, as well as a case where the predetermined portion is directly connected to the other portion. Also, when the predetermined portion is described to include a predetermined constituent element, it indicates that unless otherwise defined, the predetermined portion may further include another constituent element, not precluding the other constituent element.

The term module described in the present specification indicates a single unit to process a predetermined function or operation and may be configured by hardware or software, or a combination of hardware and software.

Specific terms are provided to help understandings of the present invention. The use of the specific terms may be changed into other forms without departing from the technical idea of the present invention.

The present invention relates to a video conference terminal matching a line of sight between a user and a camera by inserting one or more cameras at the center or several portions of a display unit and a controlling method thereof. In the present invention, it is possible to match a line of sight between a user and a camera by inserting one or more cameras at the center or several potions of a display unit, variably provide sizes of one or more videos displayed on the display unit (for example, a screen) based on a projector, provide a 3D video conference, provide a synchronization function between the projector and the camera in order to prevent the video outputted from the projector from being reflected on the camera, or remove the video (light) outputted from the projector included in the video photographed by the camera by a signal processing method.

Hereinafter, exemplary embodiments of the present invention will be described in detail with reference to the accompanying drawings.

FIG. 1 is a block diagram illustrating a configuration of a video conference system 10 according to an exemplary embodiment of the present invention.

The video conference system 10 according to the exemplary embodiment of the present invention includes a server 100, a plurality of video conference terminals 200, and a communication network 300 connecting the server 100 and the plurality of video conference terminals 200 through a wire/wireless communication system.

The server 100 performs a call connection (communication connection) function for a video conference (video calling) between the plurality of video conference terminals 200 included in the video conference system 10, a monitoring function of states of each video conference terminal (including a call state, a network state, and the like), a call ending function, and the like.

According to an exemplary embodiment, the server 100 may be configured so that any video conference terminal 200 among the plurality of video conference terminals 200 included in the video conference system 10 performs the function of the corresponding server 100.

Figure 2:
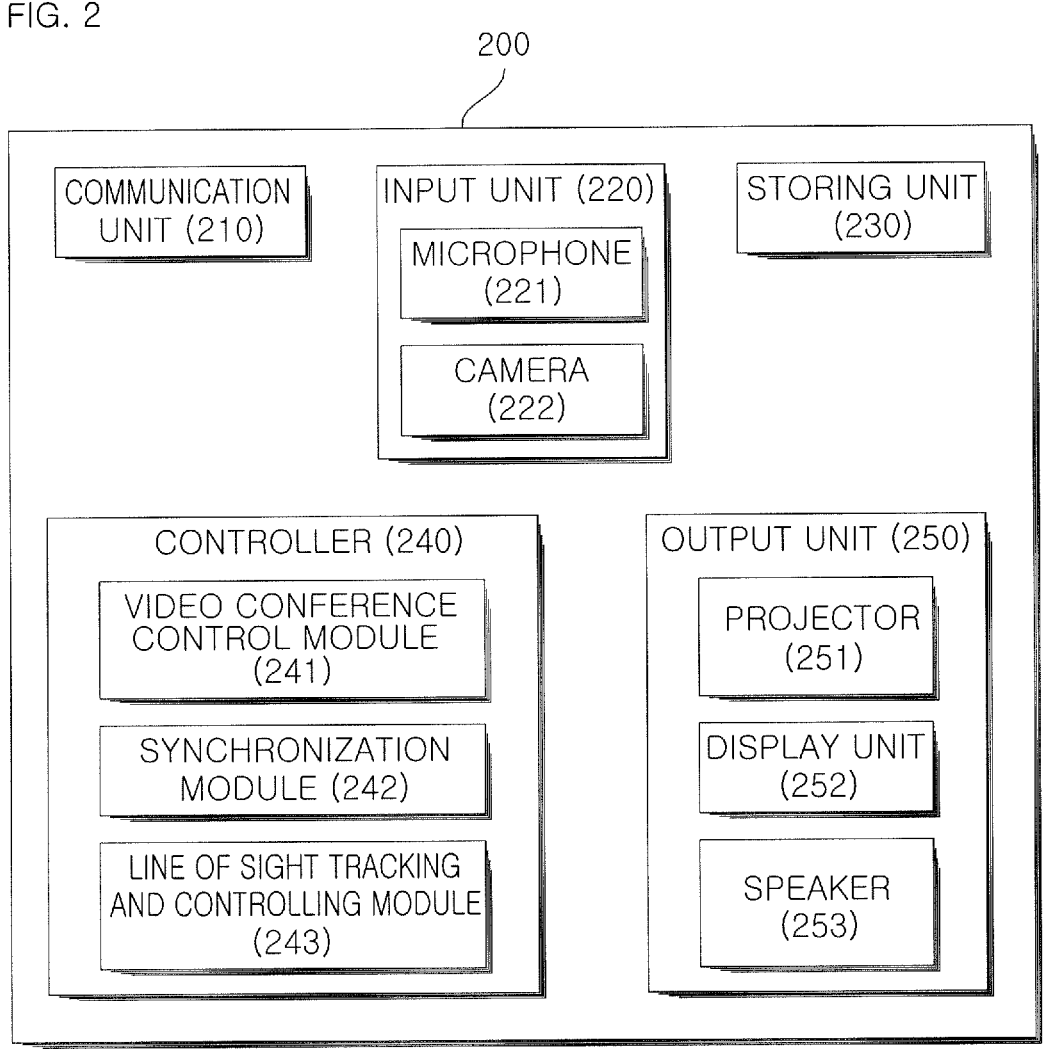
FIG. 2 is a block diagram illustrating a configuration of a video conference terminal according to an exemplary embodiment of the present invention.

The video conference terminal 200 according to the exemplary embodiment of the present invention includes a communication unit 210, an input unit 220, a storing unit 230, a controller 240, and an output unit 250 as shown in FIG. 2.

The communication unit (or wireless communication module) 210 according to the exemplary embodiment of the present invention performs a transmitting and receiving function of voice and video data between the video conference terminal 200 and an external video conference terminal.

The communication unit 210 may include one or more components for performing a wire/wireless communication with at least one video conference terminal 200 included in the video conference system 10 or a wire/wireless communication between the video conference terminal 200 and a network in which the video conference terminal 200 is disposed. In this case, the communication unit 210 may include a module for wireless Internet connection or a short range communication. Herein, as a wireless Internet technique, a wireless LAN (WLAN), a wireless broadband (Wibro), a Wi-Fi, a world interoperability for microwave access (Wimax), a high speed downlink packet access (HSDPA), and the like may be included and as a short range communication technique, a bluetooth, a ZigBee, an ultra wideband (UWB), a radio frequency identification (RFID), an infrared data association (IrDA), and the like may be included. A wire communication technique may include a universal serial bus (USB) communication and the like.

The communication unit 210 may perform communication with the server 100 or the external video conference terminal through the communication network 300 based on a unique IP address which is preset (or randomly set) in the video conference terminal 200.

The communication unit 210 transmits and receives signals with at least one of a base station, an external terminal (including a video conference terminal, a mobile terminal, and the like), and the server 100 by using the communication network 300. Herein, the signals may include various types of data according to the transmission and reception of a voice call signal, a video call signal, and/or a text/multimedia message.

The input unit 220 according to the exemplary embodiment of the present invention includes at least one microphone 221 and at least one camera 222, as shown in FIG. 2.

The microphone 221 according to the exemplary embodiment of the present invention receives an external sound signal by a microphone in a calling mode, a recording mode, a voice recognition mode, a video calling mode, a video conference mode, and the like to process the external sound signal to electrical voice data. The processed voice data may be outputted through a speaker 253 included in the output unit 250 or converted into a transmittable form by an external terminal and outputted. The microphone 221 may apply various noise removal algorithms in order to remove noise generated in a process of receiving the external sound signal.

The camera 222 according to the exemplary embodiment of the present invention processes a video frame of a still video, a moving video, or the like acquired by at least one image sensor in a video calling mode, a photographing mode, a video conference mode, and the like. That is, the corresponding video data acquired by the image sensor are decoded so as to conform to each standard according to a CODEC. The video frame processed in the camera 222 may be displayed on the output unit 250 by the control of the controller 240. The video frame processed in the camera 222 may be stored in the storing unit 230 or transmitted to the outside (including any video conference terminals included in the video conference system 10) through the communication unit 210.

The camera 222 is installed at any position of the display unit 252 included in the output unit 250. Herein, in the case where one camera 222 is disposed at the display unit 252, the corresponding camera may be disposed at a fixed position (for example, any one position of the center of the display unit 252, the center of the screen on which the other party's video is displayed, and a point at which the other party's face (or eye) included in the other party's video is disposed) or movably installed.

The input unit 220 receives a signal according to a button control by the user or receives a command or a control signal generated by the control, for example, touching/scrolling the displayed screen.

The input unit 220 may use various devices such as a keyboard, a key pad, a dome switch, a touch pad (constant pressure/electrostatic), a touch screen, a jog shuttle, a jog wheel, a jog switch, a mouse, a stylus pen, a touch pen, a laser pointer, and the like. In this case, the input unit 220 receives a signal corresponding to the input by the various devices.

The storing unit 230 according to the exemplary embodiment of the present invention stores data and programs required when the video conference terminal 200 operates. The storing unit 230 stores a signal processing algorithm for removing the video (light) outputted from a projector 251 included in the output unit 250 from the videos photographed through the camera 222.

The storage unit 230, for example, may include at least one storage medium of a flash memory type, a hard disk type, a multimedia card micro type, a card type memory (for example, an SD or XD memory, or the like), a magnetic memory, a magnetic disk, an optical disk, a random access memory (RAM), a static random access memory (SPAM), a read-only memory (ROM), an electrically erasable programmable read-only memory (EEPROM), and a programmable read-only memory (PROM).

The storing unit 230 stores various kinds of management information including video codec setting information of the corresponding video conference terminal 200 (including video/audio/codec setting information, etc.), call standard setting information (including H.248, H.323, SIP, MGCP, intelligent network application protocol (INAP)), ISDN user part (ISUP), transmission control application part (TCAP), MEGACO, V.35/RS-449/RS-530 setting information, international services digital network (ISDN), call basic setting information, etc.), network setting information (including network address translation (NAT), domain name service (DNS), IP address, QoS information, streaming information, simple network management protocol (SNMP), etc.), security setting information (including firewall setting information, etc.), and the like.

The controller 240 according to the exemplary embodiment of the present invention controls overall operations of the video conference terminal 200. For example, the controller 240 performs controlling and processing relating to a voice calling, a data communication, a video calling, a video conference, and the like. The controller 240 performs an encoding or decoding function for the video photographed through the camera 222 or the received video.

The controller 240 includes a video conference control module 241, a synchronization module 242, and a line of sight tracking and controlling module 243, as shown in FIG. 2. Herein, the controller 240 may be configured so as to be included in the video conference terminal 200, configured as a separately independent device, or configured in a form embedded in the camera 222 or the projector 251 included in the output unit 250.

The video conference control module 241 according to the exemplary embodiment of the present invention manages the call connection related to the video calling (video conference) with at least any one of the video conference terminals. In the case where the video conference control module 241 normally communicates with at least any one of the video conference terminals, the video conference control module 241 performs video/voice communication (or video conference) with at least any one of the video conference terminals. That is, while at least any one of the video conference terminals included in the video conference system 10 and the video conference system operate, the video conference control module 241 processes the video and/or voice information transmitted from at least any one of the video conference terminals to a predetermined signal to output the processed signal through the output unit 250.

The video conference control module 241 transmits the user's voice acquired through the microphone 221 to the server 100 through the communication unit 210. The video conference control module 241 transmits the user's video acquired through the camera 222 to the server 100 through the communication unit 210.

Herein, the user's video means a video in which the video (light) outputted from the projector 251 included in the output unit 250 from the videos photographed through the camera 222 is removed (for example, the video in which the video outputted from the projector 251 is removed from the videos photographed through the camera 222 after the camera 222 and the projector 251 are synchronized or the videos photographed by the camera 222 through the signal processing process).

The video conference control module 241 outputs the user's voice acquired through the microphone 221 or the other party's voice transmitted from any video conference terminal received through the communication unit 210 through the speaker 253 included in the output unit 250.

The video conference control module 241 displays one or more of the user's video acquired through the camera 222 or one or more the other party's videos received through the communication unit 210, and picture in picture (PIP) data configured by merging the user's video and one or more the other party's videos on the display unit 252 through the projector 251 included in the output unit 250. The video conference control module 241 may receive the video mixed with the video of the plurality of video conference terminals through the communication unit 210 and display the received mixed video on the display unit 252 through the projector 251. That is, when the video conference control module 241 performs the video calling (video conference) with the plurality of video conference terminals, the video conference control module 241 may receive the mixed video in the server 100 to output the received mixed video, or receive each video transmitted from each video conference terminal and mix (merge) the received video and the user's video acquired through the camera 222 to output the mixed video.

When any video is displayed on the display unit 252 through the projector 251 included in the output unit 250, the video conference control module 241 may display the video by variably changing the size of the displayed video and display the corresponding video on the display unit 252 in a 3D mode by using one projector or a plurality of projectors 251.

The video conference control module 241 controls the operation of the plurality of cameras 222. That is, the video conference control module 241 controls the operation of any camera 222 selected by the line of sight tracking and controlling module 243 among the plurality of cameras 222.

The synchronization module 242 according to the exemplary embodiment of the present invention synchronizes the camera 222 and the projector 251, in order to prevent the videos photographed through the camera 222 from overlapping with each other because the videos photographed through the camera 222 provided at any position of the display unit 252 included in the output unit 250 overlap with the video outputted from the projector 251 included in the output unit 250. The synchronization module 242 removes the video (light) outputted from the projector 251 from the videos (including the videos (light) outputted from the projector 251) photographed through the camera 222 by using a pre-stored signal processing algorithm in the storing unit 230, in order to prevent the videos photographed through the camera 222 from overlapping with each other because the videos photographed through the camera 222 provided at any position of the display unit 252 included in the output unit 250 overlap with the video outputted from the projector 251 included in the output unit 250. That is, by the control of the synchronization module 242, the user's video photographed through the camera 222 may be a video in which the video (light) outputted from the projector 251 is removed.

The line of sight tracking and controlling module 243 according to the exemplary embodiment of the present invention selects the corresponding camera 222 coinciding with the user's line of sight among the plurality of cameras 222 provided at the plurality of positions of the display unit 252 included in the output unit 250. That is, the line of sight tracking and controlling module 243 recognizes the user (person) among objects photographed through the plurality of cameras 222 by using various object recognition algorithms pre-stored in the storing unit 230, checks a position of the user's eyes of the recognized user's face, calculates viewing angles between the checked position of the user's eyes and a focus of each camera 222 (for example, including a horizontal angle, a vertical angle, etc. with respect to an X axis and a Y axis), and selects the camera 222 having the smallest viewing angle among the calculated viewing angles (or the camera coinciding with the line of sight between the user and the camera).

The line of sight tracking and controlling module 243 checks whether the user's line of sight is changed in real time and then, when the user's line of sight is changed and the user's line of sight is changed from the previously selected camera to another camera, the camera corresponding to the user's changed line of sight (or the most similar to the user's changed line of sight among the plurality of cameras) is selected.

The line of sight tracking and controlling module 243 calculates a viewing angle between one camera 222 provided at any position of the display unit 252 included in the output unit 250 and the user's line of sight and moves the camera 222 so that the user's line of sight coincides with the camera 222 based on the calculated viewing angle. Herein, when the user's line of sight coincides with the camera 222, the position of the user's line of sight may be disposed on the same line as a focus axis of the camera (or the center of a camera lens).

The line of sight tracking and controlling module 243 checks whether the user's line of sight is changed in real time and then, when the user's line of sight is changed, the line of sight tracking and controlling module 243 controls the camera 222 so as to move the position of the camera 222 in accordance with the user's changed line of sight.

The output unit 250 according to the exemplary embodiment of the present invention includes a projector 251, a display unit 252, and a speaker 253, as shown in FIG. 2.

The projector 251 according to the exemplary embodiment of the present invention is movable or portable and configured so as to be fixed at a predetermined position including a support.

The display unit 252 according to the exemplary embodiment of the present invention displays the video (light) outputted from the projector 251. Herein, the display unit 252 may be any screen and may also be all available display devices capable of displaying the video outputted from the projector 251.

The display unit 252 includes any support member and one or more cameras 222 may be disposed at the support member. Herein, one or more cameras 222 disposed at any position of the display unit 252 may be disposed so as to form the same plane as the surface of the display unit 252. When the plurality of cameras 222 are disposed on the display unit 252, the positions of the plurality of cameras 222 on the display unit 252 may be displayed on the display unit 252 by the control of the controller 240.

The positions of one or more cameras 222 disposed at any position of the display unit 252 may be controlled by the control of the line of sight tracking and controlling module 243. Camera angles of one or more cameras 222 may be controlled in upper/lower/left/right directions. That is, one or more cameras 222 are configured so as to control a tilt or a pan.

The speaker 253 according to the exemplary embodiment of the present invention outputs the user's voice or the other party's voice.

The communication network 300 according to the exemplary embodiment of the present invention connects the server 100 and one or more video conference terminals 200 to each other. The communication network 300 includes a hub, a bridge, a gateway, a router, and the like.

Figure 3:
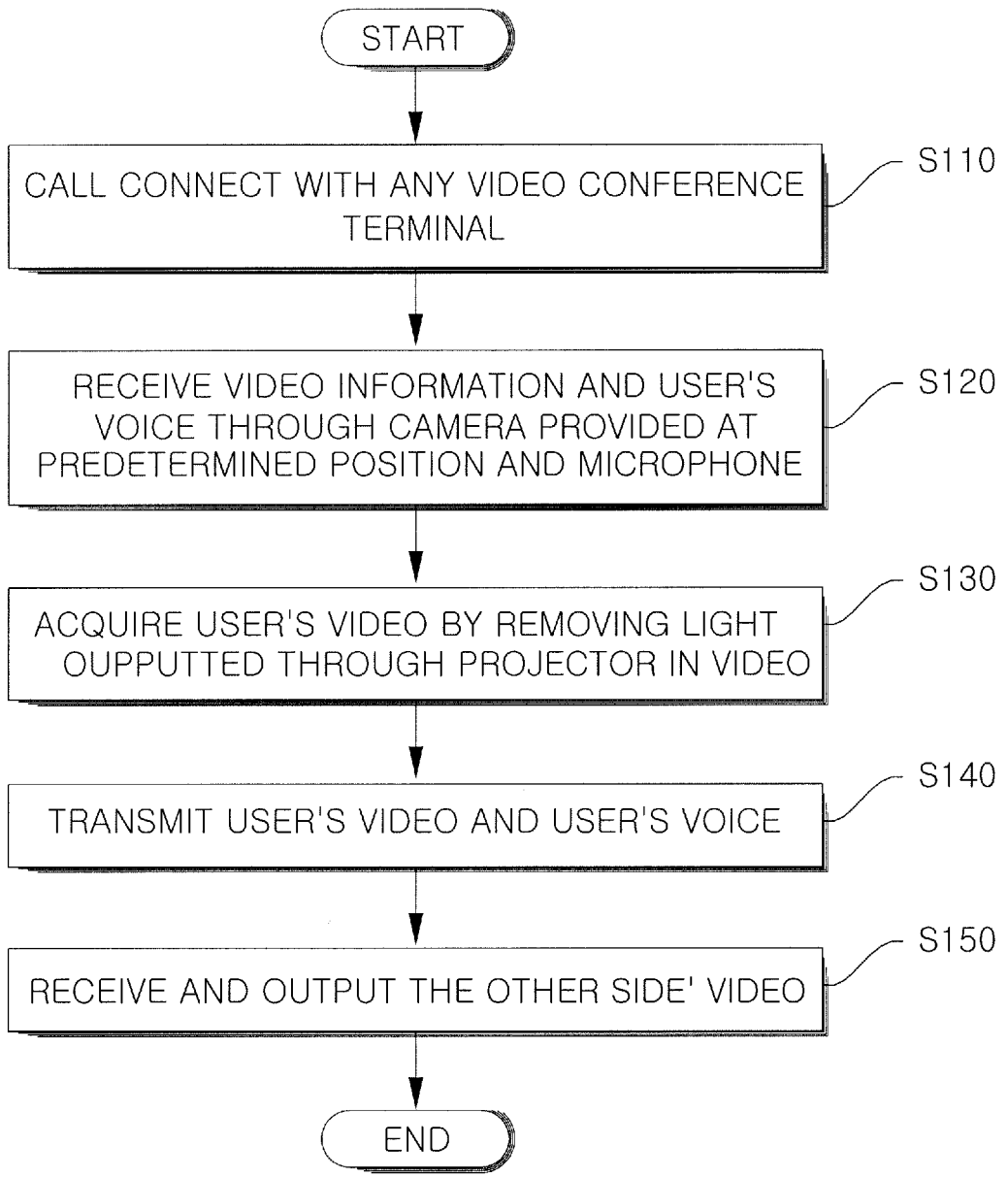
FIG. 3 is a flowchart illustrating a video conference method according to a first exemplary embodiment of the present invention.

FIG. 3 is a flowchart illustrating a video conference method according to a first exemplary embodiment of the present invention.

Hereinafter, this diagram will be described with reference to FIGS. 1 to 3.

First, when the video conference mode (video calling mode) is set, the video conference control module 241 included in a first video conference terminal 200 requests a call connection with a second video conference terminal 200 to any server 100 connected to each other through the communication network 300. The video conference control module 241 receives normal call connection success information with the second video conference terminal 200 transmitted from the server 100 through the communication unit (S110).

The input unit 220 receives user's voice and video information through the microphone 221 and the camera 222, respectively. Herein, the camera 222 is provided at a predetermined position of the display unit 252 included in the output unit 250. In this case, the camera 222 is provided at the position of the display unit 252 (for example, the center of the display unit 252 or the screen center on which the other party's video is displayed) where the user's line of sight of the first video conference terminal 200 coincides with the camera 222 and is configured so as to be not fixed but freely movable.

The synchronization module 242 synchronizes the projector 251 and the camera 222, in order to prevent the videos photographed through the camera 222 from overlapping with each other because the video photographed through the camera 222 overlaps with the video outputted from the projector 251. The synchronization module 242 removes the video (light) outputted from the projector 251 from the videos photographed through the camera 222 by using a pre-stored signal processing algorithm in the storing unit 230 (S130).

The video conference control module 241 transmits the user's voice and/or the user's video (for example, the video in which the light outputted from the projector 251 is removed from the videos photographed through the camera 222 after the camera 222 and the projector 251 are synchronized or the videos photographed by the camera 222) to the server 100 through the communication unit 210 (S140).

The video conference control module 241 receives a second user's voice (the other party's voice) and/or the second user's video (the other party's video) acquired from the second video conference terminal transmitted from the server 100 through the communication unit 210.

The video conference control module 241 displays one or more of the user's video acquired from the first video conference terminal, the received other side's video, and the PIP data merging the user's video and the other party's video on the display unit 252 through the projector 251.

The video conference control module 241 outputs the user's voice or the other party's voice acquired from the first video conference terminal through the speaker 253.

As described above, when the video conference mode (video calling mode) is set, the video conference control module 241 transmits the user's video and/or the user's voice to the second video conference terminal through the communication network 300 to share the user's video and/or the user's voice with the other party's video conference terminal involved in the video conference system 10 (S150).

Figure 4:
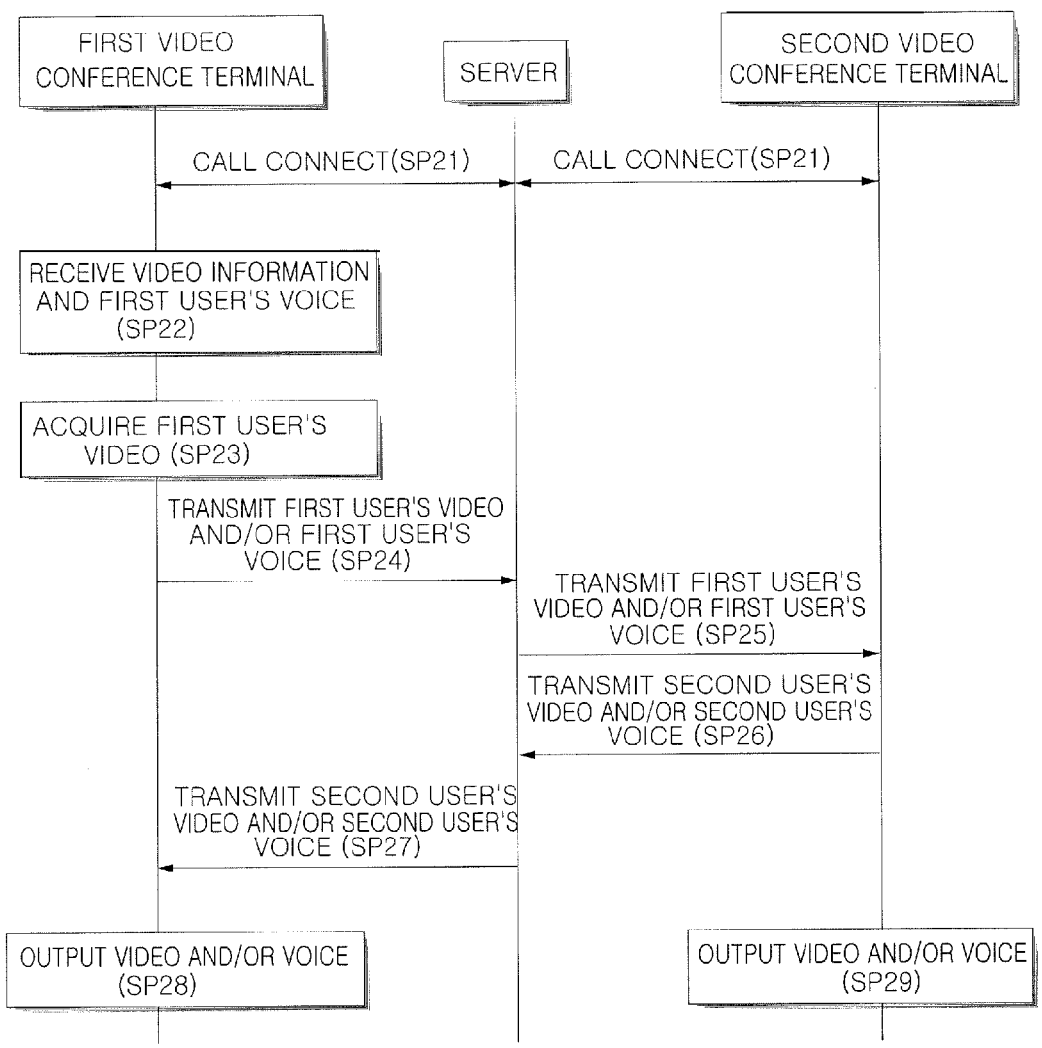
FIG. 4 is a flowchart illustrating a communication process between terminals included in a video conference system according to a second exemplary embodiment of the present invention.

FIG. 4 is a flowchart illustrating a communication process between terminals included in a video conference system according to a second exemplary embodiment of the present invention.

First, when the video conference mode (video calling mode) is set (selected), the first video conference control module 241 included in the first video conference terminal 200 performs a call connection (video calling or communication connection) with a second video conference terminal 200 through any server 100 connected to each other by using the communication network 300 (SP21).

The first video conference terminal 200 receives the first user's voice and the first video information through the microphone 221 and the first camera 222 included in the first input unit 220. Herein, the first camera 222 is provided at a predetermined position of the first display unit 252 included in the first output unit 250. In this case, the first camera 222 is provided at the position of the first display unit 252 where the user's line of sight of the first video conference terminal 200 coincides with the first camera 222 (for example, the center of the first display unit 252 or the screen center on which the other party's video is displayed) and is configured so as to be not fixed but freely movable (SP22).

The synchronization module 242 synchronizes the first projector 251 and the first camera 222 or removes the video (light) outputted from the first projector 251 from the videos photographed through the first camera 222 by using a pre-stored signal processing algorithm in the first storing unit 230 (SP23).

The first video conference control module 241 transmits the first user's voice and/or the first user's video (for example, the video in which the light outputted from the first projector 251 is removed from the videos photographed through the first camera 222 after the first projector 251 and the first camera 222 are synchronized or the videos photographed by the first camera 222) to the server 100 through the first communication unit 210. The server 100 transmits the first user's voice and/or the first user's video transmitted from the first video conference control module 241 to the second video conference control module 241 included in the second video conference terminal 200 (SP24).

The second video conference terminal 200 receives the second user's voice and the second video information through the second microphone 221 and the second camera 222 included in the second input unit 220, respectively. The second synchronization module 242 included in the second video conference terminal 200 synchronizes the second projector 251 and the second camera 222, or removes the video (light) outputted from the second projector 251 from the videos photographed through the second camera 222 by using a pre-stored signal processing algorithm in the second storing unit 230 (SP25).

The second video conference control module 241 transmits the second user's voice and/or the second user's video (for example, the video in which the light outputted from the second projector 251 is removed from the videos photographed through the second camera 222 after the second camera 222 and the second projector 251 are synchronized or the videos photographed by the second camera 222) to the server 100 through the second communication unit 210. The server 100 transmits the second user's voice (the other party's voice) and/or the second user's video (the other party's video) transmitted from the second video conference control module 241 to the first video conference control module 241 (SP26).

The first video conference control module 241 receives the other party's voice and/or the other party's video acquired from the second video conference terminal transmitted from the server 100 through the first communication unit 210.

The second video conference control module 241 receives the first user's voice and/or the first user's video transmitted from the server 100 (SP27).

The first video conference control module 241 displays one or more of the first user's video acquired from the first video conference terminal, the received other side's video (the second user's video), and the PIP data configured by merging the first user's video and the other party's video on the display unit 252 through the first projector 251. The first video conference control module 241 outputs the first user's voice or the other party's voice (the second user's voice) acquired from the first video conference terminal through the first speaker 253 (SP28).

The second video conference control module 241 displays one or more of the second user's video acquired from the second video conference terminal, the received first user's video, and the PIP data configured by merging the second user's video and the first user's video on the second display unit 252 through the second projector 251. The second video conference control module 241 outputs the second user's voice or the first user's voice acquired from the second video conference terminal through the second speaker 253 (SP29).

Figure 5:
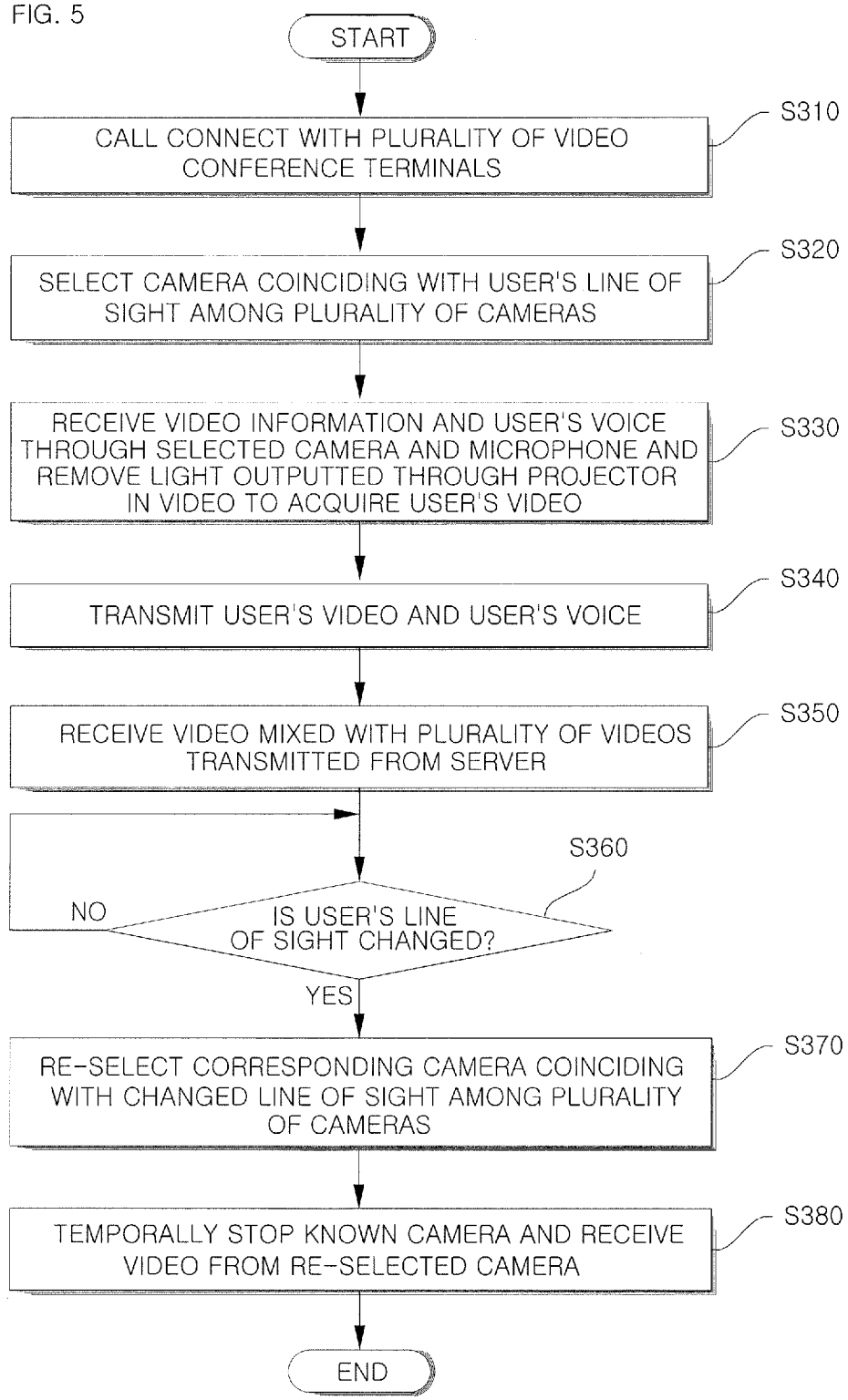
FIG. 5 is a flowchart illustrating a video conference method according to a third exemplary embodiment of the present invention.

FIG. 5 is a flowchart illustrating a video conference method according to a third exemplary embodiment of the present invention.

Hereinafter, this diagram will be described with reference to FIGS. 1, 2, and 5.

First, when the video conference mode (video calling mode) is set, the video conference control module 241 included in the first video conference terminal 200 performs a call connection among the plurality of video conference terminals involved in the video conference system 10 through any server 100 connected to each other by using the communication network 300 (S310).

The line of sight tracking and controlling module 243 selects the corresponding camera 222 coinciding with the user's line of sight among the plurality of cameras 222 provided at the plurality of positions of the display unit 252. That is, the line of sight tracking and controlling module 243 calculates viewing angles between the plurality of cameras 222 and the user's line of sight (for example, including a horizontal angle, a vertical angle, and the like with respect to an X axis and a Y axis) and selects the camera having the smallest viewing angle among the calculated viewing angles. Herein, the plurality of cameras are configured so as to be not fixed but freely movable (S320).

The input unit 220 receives the user's voice and the video information through the microphone 221 and the previously selected camera 222, respectively.

The synchronization module 242 synchronizes the projector 251 and the camera 222, in order to prevent the videos photographed through the camera 222 from overlapping with each other because the video photographed through the camera 222 overlaps with the video outputted from the projector 251. The synchronization module 242 removes the video (light) outputted from the projector 251 from the videos photographed through the selected camera 222 by using a pre-stored signal processing algorithm in the storing unit 230 (S330).

The video conference control module 241 transmits the user's voice and/or the user's video (for example, the video in which the light outputted from the projector 251 is removed from the videos photographed through the selected camera 222 after the camera 222 and the projector 251 are synchronized or the videos photographed by the selected camera 222) to the server 100 through the communication unit 210 (S340).

The video conference control module 241 receives the video mixed with the video information of each of the plurality of video conference terminals involved in the video conference system 10 transmitted from the server 100 through the communication unit 210. The video conference control module 241 outputs the user's voice (or the other party's voice) acquired from any video conference terminal transmitted from the server 100 through the communication unit 210.

The video conference control module 241 displays the received mixed video on the display unit 252 through the projector 251.

The video conference control module 241 outputs the user's voice or the other party's voice acquired from the first video conference terminal through the speaker 253 (S350).

The line of sight tracking and controlling module 243 checks whether the user's line of sight is changed in real time (S360).

When the user's line of sight is changed and then, the user's line of sight is changed from the previously selected camera to another camera, the line of sight tracking and controlling module 243 selects the corresponding camera 222 in accordance with the user's changed line of sight (S370).

The video conference control module 241 temporally stops the operation of the previously selected camera and controls the operation of the corresponding camera 222 coinciding with the user's changed line of sight to receive the video from the corresponding camera 222 and transmit the received video to the server 100 through the communication unit 210 (S380).

Figure 6:
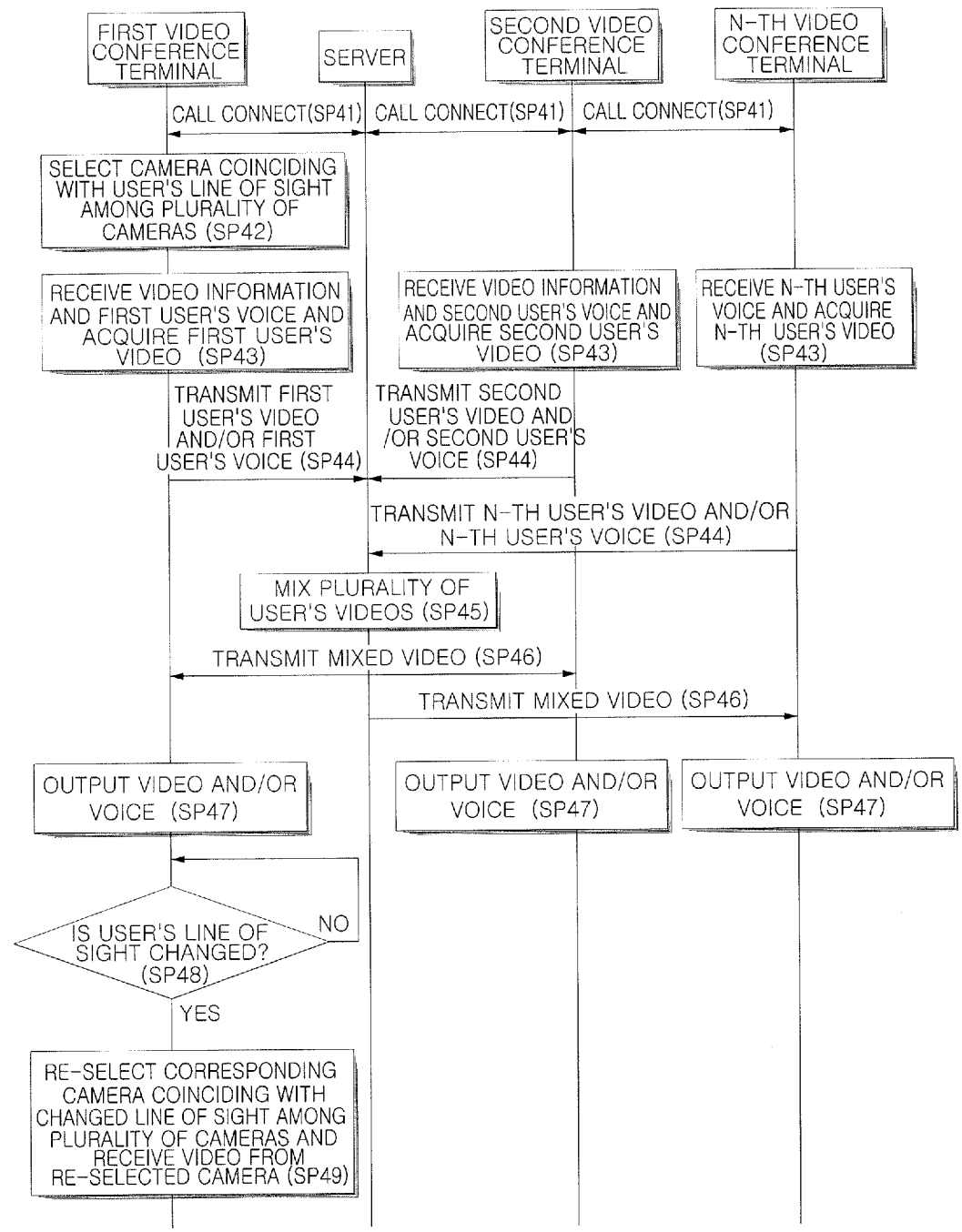
FIG. 6 is a flowchart illustrating a communication process between terminals included in a video conference system according to a fourth exemplary embodiment of the present invention.

FIG. 6 is a flowchart illustrating a communication process between terminals included in a video conference system according to a fourth exemplary embodiment of the present invention.

First, when the video conference mode (video calling mode) is set (selected), the first video conference control module 241 included in the first video conference terminal 200 performs a call connection (video calling or communication connection) with the plurality of video conference terminals involved in the video conference system 10 through any server 100 connected to each other by using the communication network 300 (SP41).

The first line of sight tracking and controlling module 243 selects the corresponding camera 222 coinciding with the user's line of sight among the plurality of cameras 222 provided at the plurality of positions of the first display unit 252. That is, the first line of sight tracking and controlling module 243 calculates viewing angles between the plurality of first cameras 222 and the user's line of sight (for example, including a horizontal angle, a vertical angle, and the like with respect to an X axis and a Y axis) and selects the camera having the smallest viewing angle among the calculated viewing angles. Herein, the plurality of cameras are configured so as to be not fixed but freely movable (SP42).

The first input unit 220 receives the user's voice and the video information through the first microphone 221 and the previously selected camera 222, respectively.

The first synchronization module 242 synchronizes the first projector 251 and the first camera 222, or removes the video (light) outputted from the first projector 251 from the videos photographed through the selected camera 222 by using a pre-stored signal processing algorithm in the first storing unit 230.

Other plurality of video conference terminals included in the video conference system 10 receive user's voice and video information by using a microphone, a synchronization module, and a camera, and the like provided at each video conference terminal (SP43).

The first video conference control module 241 transmits the first user's voice and/or the first user's video (for example, the video in which the light outputted from the first projector 251 is removed from the videos photographed through the camera 222 after the first projector 251 and the first camera 222 are synchronized or the videos photographed by the camera 222) to the server 100 through the first communication unit 210.

Each of the other video conference terminals included in the video conference system 10 transmits the received user's voice and video information to the server 100 (SP44).

The server 100 receives the videos transmitted from the plurality of video conference terminals included in the video conference system 10, mixes the plurality of received videos, and transmits the mixed video to the plurality of video conference terminals, respectively (SP45).

The first video conference control module 241 receives the mixed video transmitted from the server 100 through the first communication unit 210. The first video conference control module 241 receives the user's voice (or the other party's voice) acquired from any video conference terminal transmitted from the server 100 through the first communication unit 210.

Each of the other video conference terminals included in the video conference system 10 receive the mixed video transmitted from the server 100 and/or the user's voice (the other party's voice) acquired from any video conference terminal (SP46).

The first video conference control module 241 displays the received mixed video on the first display unit 252 through the first projector 251. The first video conference control module 241 outputs the user's voice or the other party's received voice acquired from the first video conference terminal through the first speaker 253.

Each of the other video conference terminals included in the video conference system 10 outputs the received mixed video or voice (SP47).

The first line of sight tracking and controlling module 243 checks whether the user's line of sight is changed in real time (SP48).

When the user's line of sight is changed and then, the user's line of sight is changed from the previously selected camera to another camera, the first line of sight tracking and controlling module 243 selects the corresponding camera 222 in accordance with the user's changed line of sight. That is, when the user's line of sight is changed, the first line of sight tracking and controlling module 243 selects the camera 222 of which the focus axis is disposed on the same line as the user's changed line of sight, among the plurality of cameras.

The first video conference control module 241 temporally stops the operation of the previously selected camera and controls the operation of the corresponding camera 222 coinciding with the user's changed line of sight to receive the video from the corresponding camera 222 and transmit the received video to the server 100 through the communication unit 210 (SP49).

FIG. 7 is a flowchart illustrating a video conference method according to a fifth exemplary embodiment of the present invention.

Hereinafter, this diagram will be described with reference to FIGS. 1, 2, and 7.

First, when the video conference mode (video calling mode) is set, the video conference control module 241 included in the first video conference terminal 200 performs a call connection with at least one video conference terminal involved in the video conference system 10 through any server 100 connected to each other by using the communication network 300 (S510).

The line of sight tracking and controlling module 243 calculates viewing angles between the camera 222 provided at any position of the display unit 252 and the user's line of sight (for example, including a horizontal angle, a vertical angle, and the like with respect to an X axis and a Y axis) and moves the camera 222 so as for the camera 222 to coincide with the user's line of sight based on the calculated viewing angle. Herein, the camera 222 is configured so as to be not fixed but freely movable (S520).

The input unit 220 receives the user's voice and video information through the microphone 221 and the camera 222 moved so as to coincide with the above user's line of sight.

The synchronization module 242 synchronizes the projector 251 and the camera 222, in order to prevent the videos photographed through the camera 222 from overlapping with each other because the video photographed through the camera 222 overlaps with the video outputted from the projector 251. The synchronization module 242 removes the video (light) outputted from the projector 251 from the videos photographed through the selected camera 222 by using a pre-stored signal processing algorithm in the storing unit 230 (S530).

The video conference control module 241 transmits the user's voice and/or the user's video (for example, the video in which the light outputted from the projector 251 is removed from the videos photographed through the camera 222 after the camera 222 and the projector 251 are synchronized or the videos photographed by the camera 222) to the server 100 through the communication unit 210 (S540).

The video conference control module 241 receives at least one user's voice (the other party's voice) and/or at least one user's video (at least one of the other party's video) acquired from at least one video conference terminal involved in the video conference system 10 transmitted from the server 100 through the communication unit 210.

The video conference control module 241 displays one or more of the user's video acquired from the first video conference terminal, at least one of the received other side's video, and the PIP data configured by merging the user's video and at least one of the other party's video on the display unit 252 through the projector 251.

The video conference control module 241 outputs the user's voice or at least one of the other party's voice acquired from the first video conference terminal through the speaker 253 (S550).

The line of sight tracking and controlling module 243 checks whether the user's line of sight is changed in real time (S560).

When the user's line of sight is changed, the line of sight tracking and controlling module 243 controls the camera 222 so as to coincide with the user's changed line of sight to move the position of the camera 222. That is, when the user's line of sight is changed, the line of sight tracking and controlling module 243 move the position of the camera 222 so that the focus axis of the camera 222 is disposed on the same line as the user's changed line of sight (S570).

The video conference control module 241 receives the video from the camera 222 of which the position is changed so as to coincide with the user's changed line of sight and transmits the received video to the server 100 through the communication unit 210 (S580).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A video displaying apparatus performing a video communication with another video terminal, comprising:
   a projector screen;
   at least one camera disposed at a predetermined position of the projector screen to acquire a user's video;
   a communication unit receiving the other party's video from the another video terminal and transmitting the user's video acquired through at least one camera to the other video terminal;
   a projector outputting the other party's video so that the other party's video received from the communication unit is displayed on the projector screen;
   a synchronization module using a signal processing algorithm that removes the other party's video outputted from the projector from the video acquired from the camera to acquire the user's video.

2. The apparatus of claim 1, further comprising:
   a storing unit storing the signal processing algorithm.

3. The apparatus of claim 1, further comprising:
   a line of sight tracking and controlling module recognizing the user among objects photographed through the camera (1) by using object recognition algorithms used to check a position of the user's eyes of a recognized user's face, (2) by calculating viewing angles between the checked position of the user's eyes and (3) by controlling the position and focus of the camera so that the user's changed line of sight and a focus axis of the camera are the same line as each other when the user's line of sight of the video displaying apparatus is changed.

4. The apparatus of claim 1, wherein the predetermined position of the projector screen on which the camera is installed is the center of the projector screen or the screen center on which the other party's video is displayed.

5. The apparatus of claim 1, further comprising:
   a speaker outputting a voice corresponding to the other party's video displayed on the projector screen.

6. The apparatus of claim 1, wherein when the camera is two or more and the user's line of sight is changed, the communication unit transmits the user's video from the camera when the user's changed line of sight and the focus axis are disposed on the same line as each other to the other video terminal.

7. A controlling method of a video displaying apparatus using a projector in order to communicate with two or more the other parties, the method comprising:
   displaying two or more the other party's videos on a projector screen;
   detecting the other party's video corresponding to the user's line of sight among the two or more the other party's videos;
   acquiring the user's video acquired from the camera corresponding to the detected other side's video among two or more cameras installed on the projector screen; and
   removing the other party's video outputted from the projector from the video acquired from the camera to acquire the user's video using a signal processing algorithm; and
   transmitting the acquired user's video to the other party's video displaying apparatus.

8. The method of claim 7, further comprising:
   removing the other party's video outputted from the projector in the video acquired from the camera to acquire the user's video.

9. A video displaying apparatus configured to perform a video communication with another video terminal, the video displaying apparatus comprising:
- a projector screen;
- at least one camera disposed at a predetermined position at the projector screen to acquire a user's video;
- a communication unit configured to receive the other party's video from the another video terminal and configured to transmit the user's video acquired through at least one camera to the other video terminal;
- a projector configured to output the other party's video so that the other party's video received from the communication unit is displayed on the projector screen; and
- a line of sight tracking and controlling module configured (1) to recognize the user among objects photographed through the camera by using object recognition algorithms used to check a position of the user's eyes of a recognized user's face, (2) to calculate viewing angles between the checked position of the user's eyes, and (3) to control the position and focus of the camera so that the user's changed line of sight and a focus axis of the camera are the same line as each other when the user's line of sight of the video displaying apparatus is changed.

10. The apparatus of claim 9, further comprising:
- a synchronization module configured to use a signal processing algorithm that removes the other party's video outputted from the projector from the video acquired from the camera to acquire the user's video.

11. The apparatus of claim 9, further comprising:
- a speaker configured to output a voice corresponding to the other party's video displayed on the projector screen.

12. The apparatus of claim 9, further comprising:
- a storing unit configured to store the object recognition algorithms.

13. The apparatus of claim 9, wherein the predetermined position of the projector screen on which the camera is installed is the center of the projector screen or the screen center on which the other party's video is displayed.

14. The apparatus of claim 10, further comprising a storing unit configured to store the signal processing algorithm.

* * * * *